United States Patent
Beyer

(10) Patent No.: US 10,487,214 B2
(45) Date of Patent: Nov. 26, 2019

(54) METHOD FOR COATING THE SURFACE OF A SUBSTRATE

(71) Applicant: Kronos International, Inc., Leverkusen (DE)

(72) Inventor: Norbert Beyer, Frechen (DE)

(73) Assignee: Kronos International Inc, Leverkusen (DE)

(*) Notice: Subject to any disclaimer, the term of this patent is extended or adjusted under 35 U.S.C. 154(b) by 0 days.

(21) Appl. No.: 15/388,009

(22) Filed: Dec. 22, 2016

(65) Prior Publication Data

US 2017/0198148 A1   Jul. 13, 2017

(30) Foreign Application Priority Data

Jan. 8, 2016   (EP) .................................. 16000024

(51) Int. Cl.
  *C09C 1/36* (2006.01)
  *B01J 2/00* (2006.01)
  *C09C 3/06* (2006.01)

(52) U.S. Cl.
  CPC ............ *C09C 1/3661* (2013.01); *B01J 2/006* (2013.01); *C09C 3/063* (2013.01); *C01P 2006/12* (2013.01)

(58) Field of Classification Search
  CPC ........................................ B01J 2/006
  USPC ........................................ 427/212
  See application file for complete search history.

(56) References Cited

U.S. PATENT DOCUMENTS

| | | |
|---|---|---|
| 2,885,366 A | 5/1959 | Iler |
| RE27,818 E | 11/1973 | Werner |
| 4,115,144 A * | 9/1978 | Chambers ............. C09C 1/3661 |
| | | 106/428 |
| 5,840,268 A * | 11/1998 | Ikegami ................. B82Y 30/00 |
| | | 423/592.1 |
| 6,207,280 B1 * | 3/2001 | Atarashi ................... B22F 1/02 |
| | | 427/212 |
| 6,616,746 B2 | 9/2003 | Takahashi et al. |
| 8,268,069 B2 * | 9/2012 | Melson ..................... A61K 8/25 |
| | | 106/415 |

FOREIGN PATENT DOCUMENTS

| | | |
|---|---|---|
| EP | 0130272 | 1/1985 |
| WO | 2004018568 | 3/2004 |
| WO | 2007085445 | 8/2007 |

* cited by examiner

*Primary Examiner* — Tabatha L Penny
(74) *Attorney, Agent, or Firm* — Locke Lord LLP

(57) ABSTRACT

A method for coating the surface of a substrate, such as inorganic particles, with a metal oxide. A suspension is formed containing the substrate, a polyvalent anion and a metal ion where the molar ratio of the polyvalent anion to the metal ion is greater than three and the metal ion is precipitated onto the substrate as a metal oxide. Preferably, the method is used to coat titanium dioxide pigment particles with aluminum oxide.

20 Claims, No Drawings

METHOD FOR COATING THE SURFACE OF A SUBSTRATE

RELATED APPLICATIONS

This application claims the benefit of Patent App. No. EP 16000024.6 filed Jan. 8, 2016.

BACKGROUND

Field of the Invention

The invention relates to a method for coating the surface of a substrate, such as inorganic particles, with a metal oxide, wherein a reduced mass-related specific surface area of the metal oxide coating is achieved. In particular, the invention relates to the surface coating of titanium dioxide pigment particles with aluminum oxide.

Technological Background of the Invention

Inorganic particles, particularly inorganic pigment particles, are often surface-coated in order to modify certain properties, such as abrasion resistance, surface charge, dispersing properties, as well as acid resistance and light stability. Thus, U.S. Pat. No. 2,885,366 describes the application of a dense silicon dioxide coat to substrate particles, such as nickel or iron powder, glass fibers or titanium dioxide. EP 0 130 272 A1 and U.S. Re 27,818 disclose the coating of color and white pigments with different oxides and hydroxides in order to adjust properties of the thus obtained pigments.

Especially titanium dioxide pigments are also coated with hardly soluble aluminum compounds, mainly with anhydrous and/or aqueous aluminum oxide compounds, in the course of their production method. In this way, the compatibility of the pigments with the remaining components in the user systems, such as in coatings, is increased, i.e., typical properties of the white pigment, such as dispersibility, brightening capacity or opacity, are improved.

The skilled person knows different methods for precipitating aluminum oxide/hydroxide from the patent literature. U.S. Pat. No. 6,616,746 B2 relates to a method for precipitating aluminum oxide at a moving pH, in which an aqueous titanium dioxide suspension of alkaline pH is employed, then sodium aluminate is charged first, and subsequently sulfuric acid is added until a pH of 5 is reached.

U.S. Re 27,818 discloses a similar procedure in which aluminum sulfate is charged first. Subsequently, a neutral pH is set with a base or another alkaline reacting substance, and aluminum oxide is precipitated in parallel.

However, aluminum oxide is usually precipitated at a constant pH. Thus, a water-soluble alkaline aluminum compound and an acidic compound, such as an acid or a water-soluble acidic aluminum compound, are added to the suspension at a constant pH, and aluminum oxide is precipitated. Alternatively, there may also be employed a water-soluble acidic aluminum compound and an alkaline compound, such as a base, or a water-soluble alkaline aluminum compound to precipitate the aluminum oxide. These method variants are disclosed, for example, in EP 1 603 978 B1 and EP 1 989 264 B 1.

However, the known methods for coating the surface of titanium dioxide pigments with aluminum oxide/hydroxide lead to further modifications of the particle surface, for example, an increase of the mass-related specific surface area, which can be determined by BET, or a shift of the isoelectric point. In the field of coatings, the additional surface consequently leads to an increased demand for additives, such as dispersants and binders. This is disadvantageous due the additional cost for the formulation and the limitation of the degrees of freedom for optimizing the formulation.

Therefore, there is a need in the art for a method by which a desired amount of aluminum oxide can be applied, and nevertheless properties such as the specific surface area and the position of the isoelectric point can be controlled more independently. Further, there is a need for coating systems with a lower proportion of dispersant and binder.

BRIEF DESCRIPTION OF THE INVENTION

The problem underlying the invention is to provide a method for coating the surface of a substrate, especially of inorganic particles, with a metal oxide, by which a lower mass-related specific surface area is produced as compared to the prior art methods.

This problem is solved by a method for reducing the mass-related specific surface area of a metal oxide-containing coating on a substrate, wherein the metal oxides are precipitated from an aqueous solution containing metal ions and polyvalent anions by increasing the molar ratio of anions to metal ions in the solution to at least 3.

Other advantageous embodiments of the invention are stated in the dependent claims.

DESCRIPTION OF THE PREFERRED EMBODIMENTS

These and further aspects, features and advantages of the invention become apparent to the skilled person from a study of the following detailed description of certain preferred embodiments and claims. Each feature from one aspect of the invention may also be used in any other aspect of the invention and the invention does not require that all disclosed features or objectives are met. Further, of course, the examples contained herein are intended to describe and illustrate the invention, but not to limit it, and in particular, the invention is not limited to such examples. All values disclosed in the following relating to the size in µm etc., the concentration in % by weight or % by volume, the pH etc., are to be understood as including all the values within the range of measuring errors as known to the skilled person. If several preferred numerical ranges are stated in this form, of course, all the ranges formed by a combination of the different end points are also included. The term "substantially free" is intended to connote that the particular material is not detected (i.e. is below the detection limit) using standard commercial tests and methodologies used in the industry as of the earliest priority date of this application and to allow for the presence of minor trace amounts that may be present as impurities or contaminants in commercially available materials. The term "about" with respect to numerical values and/or ranges is intended to capture the full range of measuring accuracy and uncertainty ranges of standard commercial tests.

"Metal oxide" as used herein relates to both pure metal oxide and all corresponding hydroxide- or water-containing metal oxide phases.

The precipitation of metal oxides, such as aluminum oxide, from different water-soluble precursor compounds generally proceeds spontaneously and completely. In particular, when titanium dioxide pigments are prepared, the initially precipitated water-laden metal oxide compounds are dewatered in the course of the subsequent processing steps, such as drying of the suspension filter paste, milling, and stoichiometrically approximate the anhydrous metal oxide.

Studies within the scope of the present invention have shown that some surface properties of the precipitated metal oxide, such as the specific surface area or the isoelectric point (IEP), are influenced by the presence of polyvalent anions in the suspension during the precipitation. Suitable anions include, without limitation, sulfate, phosphate, citrate, ascorbate, isoascorbate and oxalate. These polyvalent anions employed according to the invention are also referred to as "precipitation additive" in the following. In particular, the properties of the precipitated metal oxide can be controlled through the quantitative ratios of the anions present in the suspension to the metal ions to be precipitated according to the invention.

Without being bound by theory, it is assumed that the anions act as chelating ligands in a concentration-dependent way, and that thereupon the metal oxide precipitation proceeds via a stabilization of polynuclear clusters as intermediate products of condensation. Thus, the final condensation to the desired metal oxide could proceed more frequently on average on the substrate surface (e.g., particle surface) than in the liquid phase in which the substrate is floating (e.g., as dispersed particles), the oxide migrating to the substrate or particle surface only subsequently. In this way, an improved surface of the metal oxide layer with a lower mass-related specific surface area on the surface is achieved for the same composition. At the same time, the pH of the isoelectric point (IEP) of the metal oxide-coated substrate surface is shifted towards the IEP of the pure metal oxide.

The method according to the invention is applicable in the precipitation of any metal oxides from an aqueous solution onto a substrate surface. Particularly suitable are the metal oxides of aluminum, zirconium, and silicon. Suitable polyvalent anions include, without limitation, sulfate, phosphate, citrate, ascorbate, isoascorbate and oxalate.

The substrate is preferably an inorganic particle. Suitable inorganic particles may be inorganic pigments selected from the group consisting of white pigments, such as titanium dioxide (C.I. Pigment White 6), zinc white, leaded zinc oxide; zinc sulfide, lithopone; black pigments, such as iron oxide black (C.I. Pigment Black 11), iron manganese black, spinel black (C.I. Pigment Black 27); carbon black (C.I. Pigment Black 7); color pigments, such as chromium oxide, chromium oxide hydrate green; chromium green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt and manganese violet; iron oxide red (C.I. Pigment Red 101); cadmium sulfoselenide (C.I. Pigment Red 108); cerium sulfide (C.I. Pigment Red 265); molybdate red (C.I. Pigment Red 104); ultramarine red; iron oxide brown (C.I. Pigment Brown 6 and 7), mixed brown, spinel and corundum phases (C.I. Pigment Brown 29, 31, 33, 34, 35, 37, 39 and 40), chromium titanium yellow (C.I. Pigment Brown 24), chromium orange; cerium sulfide (C.I. Pigment Orange 75); iron oxide yellow (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chromium yellow (C.I. Pigment Yellow 34), and bismuth vanadate (C.I. Pigment Yellow 184).

Further, inorganic pigments conventionally employed as fillers, such as zinc sulfide, natural and precipitated chalk and barium sulfate, may also be employed as the substrate.

Preferably, the inorganic pigment is selected from the group consisting of magnesium carbonate, barium sulfate, titanium dioxide, zinc oxide, zinc sulfide, huntite, lead white, lithopone, cristobalite, china clay, and mixtures thereof. Titanium dioxide is most preferred of all substrates disclosed herein because of its pigment properties and its high Mohs' hardness. Titanium dioxide may be in the crystal structures rutile, anatase or brookite, usually in the crystal structures rutile or anatase. Rutile is particularly suitable because of its lower photolytic catalytic activity as compared to anatase.

In a particular embodiment, the invention proceeds from an aqueous suspension of inorganic particles with a preferred particle diameter of <1 mm. Preferably, these particles have sizes of from 0.1 to 5 μm, more preferably from 0.2 to 0.4 μm. The suspension preferably has a solids content of about 200 to 800 g/l, especially from 300 to 500 g/l. Optionally, usual dispersants may be contained.

Before the surface coating according to the invention, one or more layers of other inorganic oxides, such as $SiO_2$, $ZrO_2$, $TiO_2$, $SnO_2$, $Al_2O_3$, $P_2O_5$ etc., may have been applied to the particle surface, optionally in admixture and/or co-precipitation.

The selected metal ions and the selected anions are added to the suspension. The selected metal ions are preferably added in the form of the aqueous solution of a precursor compound of the metal oxide to be precipitated. The anions are added either in the form of an aqueous solution of a corresponding salt and/or as a corresponding acid. In addition, they may be contained already in the precursor compound of the metal oxide. Suitable compounds are known in the prior art. Especially in the case of the surface treatment of titanium dioxide, the commonly used compounds may be employed in the method according to the invention.

For example, when aluminum oxide is precipitated in the presence of sulfate ions, an aluminum sulfate solution or sodium aluminate solution may be employed as an aluminum oxide precursor compound. Suitable compounds with which the anion concentration in the suspension as required according to the invention can be reached include, for example, soluble sulfates, such as aluminum sulfate, sodium sulfate, and sulfuric acid.

The actual performance of the precipitation including the pH control is effected according to usual procedures that are well established.

According to the invention, sulfate, phosphate, citrate, ascorbate, isoascorbate and oxalate, for example, are suitable as polyvalent anions. Sulfate is preferably used. The metal oxides to be precipitated are preferably oxides of aluminum, zirconium, and silicon. In a particular embodiment, aluminum oxide is precipitated onto the surface of titanium dioxide particles in the presence of sulfate ions.

In principle, it is known from the prior art to precipitate aluminum oxide in the presence of sulfate ions during the surface treatment of titanium dioxide pigment particles. However, the molar ratio of sulfate ions present during the reaction is smaller than 3, based on $Al_2O_3$, in the known methods when aluminum sulfate is employed as the precursor compound, and NaOH, for example, is used for pH control. To date, it has not been known that the specific surface area (BET) of the precipitated aluminum oxide and thus the specific surface area of the surface-treated titanium dioxide particles can be controlled through the molar ratio of sulfate ions to aluminum ions in the suspension during the precipitation.

Therefore, the metal oxides are preferably precipitated from the aqueous solution by increasing the molar ratio of anions to metal ions to from 3 to 8, more preferably to from 3.2 to 6, even more preferably from 3.5 to 5, and most preferably to 4.2.

In addition, the invention teaches that the isoelectric point (IEP) of the particles can be selectively shifted while the composition remains almost unchanged otherwise. For example, the IEP of aluminum oxide-coated titanium dioxide pigments is shifted to higher values by increasing the $SO_4/Al_2O_3$ molar ratio, with the advantage that the pigment particles dispersed in usual coating materials undergo an improved electrostatic stabilization.

EXAMPLES

The invention is described in more detail by means of the following examples, without intending to limit the scope of the invention thereby.

Example A1

An aqueous suspension of titanium dioxide particles obtained by the sulfate method with a concentration of 0.45 kg of titanium dioxide per liter was sand-milled, subsequently diluted to a concentration of 0.35 kg of titanium dioxide per liter, temperature-controlled at 60° C., and was adjusted to a pH of about 10 using NaOH. Thereafter, over a period of 30 minutes, an aqueous aluminum sulfate solution (concentration 107 g/L, calculated as $Al_2O_3$) was added in an amount of 2.7% by weight, calculated as $Al_2O_3$ and based on $TiO_2$. In the following, over a period of 45 minutes, 30% NaOH was added with stirring in such an amount that a pH of about 4 was obtained. Over another 120 minutes of stirring, the pH was adjusted to 7.6 with NaOH.

Subsequently, the particles were separated from the suspension, washed, dried at 160° C., micronized by steam milling, and the specific surface area (BET) and the isoelectric point (IEP) were determined as a function of the pH. The measured values are listed in Table 1.

Example A2

The same procedure from Example A1 was used, except that 0.5 mole of $Na_2SO_4$ per kg of titanium dioxide was additionally added to the suspension after adjusting the pH to 10 at a temperature of 60° C. and before the addition of the aqueous aluminum sulfate solution.

TABLE 1

| Example | $SO_4/Al_2O_3$ (molar proportions) | BET ($m^2/g$) | IEP (pH) |
|---|---|---|---|
| A1 | 3 | 9.3 | 8.5 |
| A2 | 5 | 9.0 | 8.5 |

Example B1

The method is started with a titanium dioxide suspension prepared, sand-milled and adjusted to a pH 10 in the same way as in Example A1. Thereafter, aqueous solutions of aluminum sulfate (concentration 107 g/L, calculated as $Al_2O_3$) and sodium hydroxide were added in parallel with stirring over a period of 90 minutes in such amounts that a constant pH of about 4 was obtained (fixed pH treatment). After another stirring period of 120 minutes, the pH was adjusted to 7.6 as before.

Subsequently, the particles were separated from the suspension, washed, dried at 160° C., micronized by steam milling, and the specific surface area (BET) and the isoelectric point (IEP) were determined as a function of the pH. The measured values are listed in Table 2.

Example B2

The same procedure used in Example B1 was repeated, except that 0.5 mole of $Na_2SO_4$ per kg of titanium dioxide was additionally added after said temperature controlling at 60° C. and adjusting the pH to 10.

TABLE 2

| Example | $SO_4/Al_2O_3$ (molar proportions) | BET ($m^2/g$) | IEP (pH) |
|---|---|---|---|
| B1 | 3 | 9.2 | 8.4 |
| B2 | 5 | 8.7 | 8.5 |

Example C1

The method is started with a titanium dioxide suspension prepared, sand-milled and adjusted to pH 10 in the same way as in Example A1.

Thereafter, aqueous solutions of aluminum sulfate (concentration 107 g/l, calculated as $Al_2O_3$) and sodium aluminate (concentration 304 g/l, calculated as $Al_2O_3$) were added in parallel with stirring over a period of 90 minutes in such amounts that a constant pH of about 4 was obtained (fixed pH treatment). Over another stirring period of 120 minutes, the pH was adjusted to 7.6 as before. Subsequently, the particles were separated from the suspension, washed, dried at 160° C., micronized by steam milling, and the specific surface area (BET) and the isoelectric point (IEP) were determined as a function of the pH. The measured values are listed in Table 3.

Example C2

The same process as used in Example C1 was repeated, except that 0.5 mole of $Na_2SO_4$ per kg of titanium dioxide was additionally added after said temperature controlling at 60° C. and adjusting the pH to 10.

TABLE 3

| Example | $SO_4/Al_2O_3$ (molar proportions) | BET ($m^2/g$) | IEP (pH) |
|---|---|---|---|
| C1 | 0.8 | 10.1 | 8.6 |
| C2 | 2.6 | 9.3 | 8.7 |

Examples D1 to D4 and Comparative Example D0

In this experimental series, the method was started with a commercially available titanium dioxide pigment (Kronos 2064), and the performance of the surface treatment was varied according to the invention. Kronos 2064 is a titanium dioxide pigment from the sulfate method surface-treated with aluminum oxide.

Comparative Example D0 includes a titanium dioxide pigment surface-treated according to Kronos 2064.

Example D1 includes a titanium dioxide pigment surface-treated according to Kronos 2064 (Comparative Example D0), except that 0.2 mole of Na$_2$SO$_4$ per kg of titanium dioxide was added together with the aluminum oxide precursor compounds.

Example D2 corresponds to D1, except that 0.5 mole of Na$_2$SO$_4$ per kg of titanium dioxide was added together with the aluminum oxide precursor compounds.

Example D3 corresponds to D1, except that 0.8 mole of Na$_2$SO$_4$ per kg of titanium dioxide was added together with the aluminum oxide precursor compounds.

Example D4 corresponds to D1, except that 1.1 moles of Na$_2$SO$_4$ per kg of titanium dioxide was added together with the aluminum oxide precursor compounds.

For the pigments according to Comparative Example D0 and for Examples D1, D2, D3, and D4, the specific surface area (BET) and the isoelectric point (IEP) were determined as a function of the pH. The measured values are listed in Table 4.

TABLE 4

| Example | SO$_4$/Al$_2$O$_3$ (molar proportions) | BET (m$^2$/g) | IEP (pH) |
|---|---|---|---|
| D0 | 1.1 | 13.7 | 7.9 |
| D1 | 1.9 | 13.9 | 8.0 |
| D2 | 2.9 | 13.6 | 8.2 |
| D3 | 4.2 | 13.4 | 8.3 |
| D4 | 5.3 | 13.9 | 8.3 |

CONCLUSION

The Examples show that increasing the molar ratio of the anions (sulfate ions) to the metal (aluminum) ions to be precipitated in the solution leads to a reduction of the mass-related specific surface area (BET of the coated particles) and thus to a more compact coating. This can also be derived from the determined values of isoelectric point (IEP). As the SO$_4$/Al$_2$O$_3$ molar ratio increases and the BET values decrease, the pH of the isoelectric point rises, thus approximating the pH of the isoelectric point for a pure Al$_2$O$_3$ surface (pH about 9). Values lower than 9 allow to conclude that there are still regions with uncovered TiO$_2$ on the surface of the particles (IEP at a pH of about 6).

What is being claimed is:

1. A method for reducing the mass-related specific surface area of a metal oxide-containing coating on a substrate comprising:
   providing an aqueous solution containing a substrate, one or more polyvalent anions, and one or more metal ions;
   precipitating a metal oxide coating from the one or more metal ions on the substrate;
   wherein the molar ratio of the one or more polyvalent anions present in the solution to the one or more metal ions present in the solution that form the metal oxide coating is at least 3.2.

2. The method of claim 1, wherein the substrate is an inorganic pigment.

3. The method of claim 2, wherein the inorganic pigment is titanium dioxide.

4. The method of claim 3 wherein the titanium dioxide has particle sizes ranging from about 0.2 to about 0.4 μm.

5. The method of claim 3 wherein the precipitated metal oxide is selected from the group consisting of aluminum oxide, zirconium oxide, silicon oxide, and mixtures thereof.

6. The method of claim 5, wherein the polyvalent anion is selected from the group consisting of sulfate, phosphate, citrate, ascorbate, isoascorbate, oxalate, and mixtures thereof.

7. The method of claim 3 wherein the polyvalent anion is selected from the group consisting of sulfate, phosphate, citrate, ascorbate, isoascorbate, oxalate, and mixtures thereof.

8. The method of claim 3, wherein:
   the metal oxide is aluminum oxide, and
   the polyvalent anion is sulfate.

9. The method of claim 3 wherein the molar ratio is from 3.2 to 8.

10. The method of claim 9 wherein the molar ratio is from 3.2 to 6.

11. The method of claim 10 wherein the molar ratio is from 3.5 to 5.

12. The method of claim 11 wherein the molar ratio is about 4.2.

13. The method of claim 1 wherein the precipitated metal oxide is selected from the group consisting of aluminum oxide, zirconium oxide, silicon oxide, and mixtures thereof.

14. The method of claim 1 wherein the polyvalent anions are selected from the group consisting of sulfate, phosphate, citrate, ascorbate, isoascorbate, oxalate, and mixtures thereof.

15. The method of claim 1, wherein:
   the metal oxide is aluminum oxide, and
   the polyvalent anion is sulfate.

16. The method of claim 1 wherein the molar ratio is from 3.2 to 8.

17. The method of claim 16 wherein the molar ratio is from 3.2 to 6.

18. The method of claim 17 wherein the molar ratio is from 3.5 to 5.

19. The method of claim 18 wherein the molar ratio is about 4.2.

20. The method of claim 1 wherein the substrate has particle sizes of from about 0.1 to about 5 μm.

* * * * *